United States Patent [19]
Cetinkaya

[11] Patent Number: 5,290,430
[45] Date of Patent: Mar. 1, 1994

[54] RISER DISENGAGER WITH SUSPENDED CATALYST SEPARATION ZONE
[75] Inventor: Ismail B. Cetinkaya, Palatine, Ill.
[73] Assignee: UOP, Des Plaines, Ill.
[21] Appl. No.: 790,924
[22] Filed: Nov. 13, 1991
[51] Int. Cl.[5] .............................. C10G 35/00
[52] U.S. Cl. ..................... 208/161; 208/152; 208/163; 208/164; 208/113; 208/176; 208/155
[58] Field of Search ................ 208/152, 161, 163

[56] References Cited
U.S. PATENT DOCUMENTS

| | | | |
|---|---|---|---|
| 3,817,872 | 6/1974 | Evans et al. | 208/161 |
| 3,938,960 | 2/1976 | Glasgow et al. | 208/161 |
| 4,295,961 | 10/1981 | Fahrig et al. | 208/161 |
| 4,701,307 | 10/1987 | Walters et al. | 208/161 |
| 4,714,541 | 12/1987 | Buyan et al. | 208/161 |
| 4,721,603 | 1/1988 | Krug et al. | 208/161 |
| 4,737,346 | 4/1988 | Haddad et al. | 208/161 |
| 4,792,437 | 12/1988 | Hettinger, Jr. | 422/147 |
| 5,055,177 | 10/1991 | Haddad et al. | 208/161 |
| 5,141,625 | 8/1992 | Lomas | 208/161 |

Primary Examiner—Helane Myers
Attorney, Agent, or Firm—Thomas K. McBride; John G. Tolomei

[57] ABSTRACT

This FCC process suspends a catalyst and a riser proximate or above the riser cyclone inlets at a density that is higher than the flowing density in the riser. The suspended catalyst provides a disengagement zone that enhances the separation of catalyst from product vapors. The riser operates in a manner that prevents any discharge of catalyst from its end. The arrangement also provides a convenient method for venting stripping vapors into a closed reactor cyclone system.

16 Claims, 2 Drawing Sheets

RISER DISENGAGER WITH SUSPENDED CATALYST SEPARATION ZONE

FIELD OF THE INVENTION

This invention relates generally to processes for the fluidized catalytic cracking (FCC) of heavy hydrocarbon streams such as vacuum gas oil and reduced crudes. This invention relates more specifically to a method for reacting hydrocarbons in an FCC reactor and separating reaction products from the catalyst used therein.

BACKGROUND OF THE INVENTION

The fluidized catalytic cracking of hydrocarbons is the main stay process for the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium. The FCC process is carried out by contacting the starting material whether it be vacuum gas oil, reduced crude, or another source of relatively high boiling hydrocarbons with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is tradionally transferred from the stripper to a regenerator for purposes of removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The rate of conversion of the feedstock within the reaction zone is controlled by regulation of the temperature of the catalyst, activity of the catalyst, quantitiy of the catalyst (i.e., catalyst to oil ratio) and contact time between the catalyst and feedstock. The most common method of regulating the reaction temperature is by regulating the rate of circulation of catalyst from the regeneration zone to the reaction zone which simultaneously produces a variation in the catalyst to oil ratio as the reaction temperatures change. That is, if it is desired to increase the conversion rate, an increase in the rate of flow of circulating fluid catalyst from the regenerator to the reactor is effected.

The hydrocarbon product of the FCC reaction is recovered in vapor form and transferred to product recovery facilities. These facilities normally comprise a main column for cooling the hydrocarbon vapor from the reactor and recovering a series of heavy cracked products which usually include bottom materials, cycle oil, and heavy gasoline. Lighter materials from the main column enter a concentration section for further separation into additional product streams.

One improvement to FCC units, that has reduced the product loss by thermal cracking, is the use of riser cracking. In riser cracking, regenerated catalyst and starting materials enter a pipe reactor and are transported upward by the expansion of the gases that result from the vaporization of the hydrocarbons, and other fluidizing mediums if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds. A number of riser designs use a lift gas as a further means of providing a uniform catalyst flow. Lift gas is used to accelerate catalyst in a first section of the riser before introduction of the feed and thereby reduces the turbulence which can vary the contact time between the catalyst and hydrocarbons.

Riser cracking whether with or without the use of lift gas has provided substantial benefits to the operation of the FCC unit. These can be summarized as a short contact time in the reactor riser to control the degree of cracking that takes place in the riser and improved mixing to give a more homogeneous mixture of catalyst and feed. A more complete distribution prevents different times for the contact between the catalyst and feed over the cross-section of the riser which would otherwise cause some portions of the feed to contact the catalyst for a longer time than other portions of the feed. Both the short contact time and a more uniform average contact time for all of the feed with the catalyst has allowed overcracking to be controlled or eliminated in the reactor riser.

Unfortunately, much of what can be accomplished in the reactor riser in terms of uniformity of feed contact and controlled contact time can be lost when the catalyst is separated from the hydrocarbon vapors. As the catalyst and hydrocarbons are discharged from the riser, they must be separated. In early riser cracking operations, the output from the riser was discharged into a large vessel. This vessel serves as a disengaging chamber and is still referred to as a reactor vessel, although most of the reaction takes place in the reactor riser. The reactor vessel has a large volume. Vapors that enter the reactor vessel are well mixed in the large volume and therefore have a wide residence time distribution that results in relatively long residence times for a significant portion of the product fraction. Product fractions that encounter extended residence times can undergo additional catalytic and thermal cracking to less desirable lower molecular weight products.

One apparatus that has been known to promote quick separation between the catalyst and the vapors in the reactor vessels is known as a ballistic separation device which is also referred to as a vented riser. The structure of the vented riser in its basic form consists of a straight portion of conduit at the end of the riser and an opening that is directed upwardly into the reactor vessel with a number of cyclone inlets surrounding the outer periphery of the riser near the open end. The apparatus functions by shooting the high momentum catalyst particles past the open end of the riser where the vapor collection takes place. A quick separation between the catalyst and the vapors occurs due to the relatively low density of the vapors which can quickly change directions and turn to enter the inlets near the periphery of the riser while the heavier catalyst particles continue along a straight trajectory that is imparted by the straight section of the riser conduit. The vented riser has the advantage of eliminating any dead area in the reactor vessel where coke can form while providing a quick separation between the catalyst and the vapors. However, the vented riser still has the drawback of operating within a large open volume in the reactor vessel. Thus, the vented riser provides catalyst separation efficiency by promoting a quick disengagement of catalyst particles from the riser gases, but has poor hydrocarbon separation efficiency since a large portion of the hydrocarbons are still carried over into the reactor vessel for an extended period of time.

In an effort to further control the contact time between catalyst and feed vapors, closed coupled cyclones have been used. Close coupled cyclones directly couple cyclones to the end of the reactor riser. This direct coupling of cyclones to the riser provides a quick separation of most of the product vapors from the catalyst. Therefore, contact time for a large portion of the feed vapors can be closely controlled. One problem with directly coupling cyclones to outlet of the reactor riser is the need for a system that can handle pressure surges from the riser. These pressure surges and the resulting transient increase in catalyst loading inside the cyclones can overload the cyclones such that an unacceptable amount of fine catalyst particles are carried over with the reactor vapor into downstream separation facilities. Therefore, a number of apparatus arrangements have been proposed for direct coupled cyclones that significantly complicate the arrangement and apparatus for the direct coupled cyclones, and either provide an arrangement where a significant amount of reactor vapor can enter the open volume of the reactor/vessel or compromise the satisfactory operation of the cyclone system by subjecting it to the possibility of temporary catalyst overloads.

Close coupled cyclones also produce a very low gas flow rate through the reactor vessel that can also promote coke deposition on the interior of the vessel. The long residence time of heavy hydrocarbons at relatively high temperature in the upper section of the reactor vessel promotes the formation of coke. These coke deposits interfere with the function of the reactor vessel by forming thick deposits on the interior of the vessel thereby insulating and locally cooling portions of the metal shell. Such locally cooled portions promote the condensation of corrosive materials that can damage the reactor vessel. In addition, other problems are created by the large coke deposits which can, from time to time, break off in large chunks and block the flow of catalyst through the vessels or conduits.

DISCLOSURE STATEMENT

U.S. Pat. No. 4,792,437 discloses a ballistic separation device.

U.S. Pat. No. 4,295,961 shows the end of a reactor riser that discharges into a reactor vessel and an enclosure around the riser that is located within the reactor vessel.

U.S. Pat. No. 4,737,346 shows a closed cyclone system for collecting the catalyst and vapor discharge from the end of a riser.

BRIEF DESCRIPTION OF THE INVENTION

It is an object of this invention to reduce the hydrocarbon residence time in a reactor vessel.

It is another object of this invention to improve the operation of a vented riser in the separation of catalyst and hydrocarbon vapors.

A further object of this invention is to control the residence time in a reactor vessel section of an FCC reaction zone.

This invention is an FCC process that is arranged to provide a vented riser that contains the ballistically separated catalyst in a suspension of catalyst particles located in the end of the riser and extending above cyclone inlet in the riser wall. The suspension of catalyst provides a suspended disengaging zone that dissipates the energy of the upwardly directed catalyst stream from the riser to retain the separated catalyst particles in the riser until the particles are withdrawn through the cyclone inlets. In this manner the catalyst, and the large amount of entrained vapors that accompany it, is not carried over into the reactor vessel and overcracking is avoided. The suspended disengaging zone also receives stripping gas from the stripping zone in the reactor vessel. Passing the stripping gas through the suspended disengaging zone performs additional stripping of the suspended catalyst by preventing hydrocarbon discharge into the vessel and improves the recovery of product vapors in the cyclone separators. The venting of stripping vapors back into the top of the riser has the further advantage of maintaining a relatively active region at the top of the reactor vessel that will prevent condensation and build-up of coke in the upper portions of the reactor.

Accordingly in one embodiment, this invention is a process for the fluidized catalytic cracking (FCC) of an FCC feedstock. The process includes the steps of passing the FCC feedstock and regenerated catalyst particles to a lower section of a reactor riser and transporting the catalyst and feedstock upwardly through a first portion of the riser thereby converting the feedstock to a gaseous product stream and producing spent catalyst particles by the deposition of coke on the regenerated catalyst particles to yield a first mixture of spent catalyst and gaseous products having a first density. A second mixture of spent catalyst and gaseous components is withdrawn from the riser through a riser outlet. At least a portion of the first mixture passes upwardly from the first portion of the riser into a suspension of catalyst particles located in a second portion of the riser. The second portion of the riser comprises a disengaging zone at the downstream end of the riser that does not discharge any substantial amounts of catalyst out of the riser. The disengaging zone has a majority of its length extending above the outlet and provides a region above the outlet of relatively higher catalyst density than the density of the first mixture. A stripping vapor stream is passed into the disengaging zone. The second mixture of catalyst particles, gaseous products, and stripping vapors are passed through a particle separator. The gaseous components are separated from the spent catalyst in the separator. Gaseous products recovered from the separator are removed from the process. Catalyst particles from the separator are passed to the stripping zone from which a stripping gas exits to produce the gaseous stripping vapor stream. Spent catalyst from the stripping zone are passed into a regeneration zone and contacted with a regeneration gas to combust coke from the catalyst particles and produce regenerated catalyst particles for transfer to the reactor riser.

In another embodiment, this invention is an apparatus for the fluidized catalytic cracking of an FCC feedstock. The apparatus includes an upwardly directed riser conduit having an upwardly directed upper section located in a reactor vessel. The separator outlet defined by a sidewall of the riser is in the upper section of the reactor riser. A disengaging chamber defined by the upper section of the riser extends for at least two riser diameters above the outlet. The riser defines a stripping vapor inlet in the disengagement chamber. A particle separator is in closed communication with the outlet for separating catalyst from the product vapors. A stripping vessel is located below the disengagement zone and in communication with the reactor vessel. A condit withdraws catalyst from the bottom of the stripping vessel and transfers catalyst to a regeneration vessel.

Additional objects, embodiments, and details of this invention are disclosed in the following detailed description of the invention.

DETAILED DESCRIPTION OF THE INVENTION

This invention relates generally to the reactor side of the FCC process. This invention will be useful for most FCC processes that are used to crack light or heavy FCC feedstocks. The process and apparatus aspects of this invention can be used to modify the operation and arrangement of existing FCC units or in the design of newly constructed FCC units.

This invention uses the same general elements of many FCC units. A reactor riser provides the primary reaction zone. A reactor vessel and cyclone separators remove catalyst particles from the gaseous product vapors. A stripping zone removes a large percentage of sorbed vapors from the surface of the catalyst. Spent catalyst from the stripping zone is regenerated in a regeneration zone having one or more stages of regeneration. Regenerated catalyst from the regeneration zone is used in the reactor riser. A number of different arrangements can be used for the reactor and regenerator sections. The description herein of specific reactor and regenerator components is not meant to limit this invention to those details except as specifically set forth in the claims.

Figure 1:
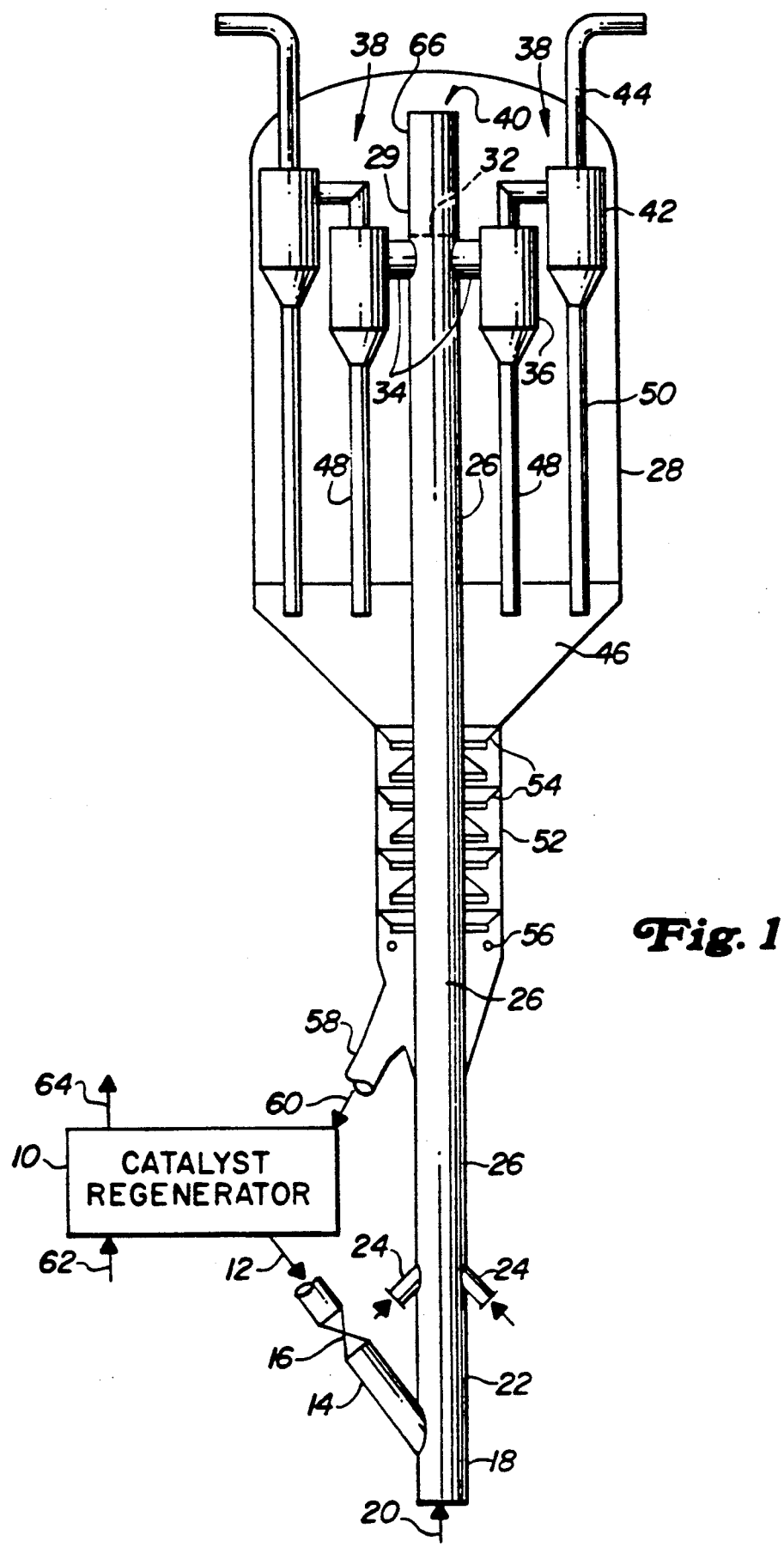
FIG. 1 shows a reactor/regenerator system for an FCC process arranged in accordance with this invention.

An overview of the basic process operation can be best understood with reference to the FIG. 1. Regenerated catalyst from a conduit 12 of a regeneration zone 10 is transferred by a conduit 14, at a rate regulated by a control valve 16, to a Y-section 18. Lift gas injected into the bottom of Y-section 18, by a conduit 20, carries the catalyst upward through a lower riser section 22. Feed is injected into the riser above lower riser section 22 by feed injection nozzles 24. The drawing shows this invention being used with a riser arrangement having a lift gas zone 22. It is not necessary that a lift gas zone be provided in the riser in order to enjoy the benefits of this invention.

The mixture of feed, catalyst and lift gas travels up an intermediate section of the riser 26 that extends into a reactor vessel 28 and together with riser sections 26 and 22 form a first portion of the riser. The first portion of the riser empties a mixture of catalyst and gaseous components into a second portion 29 of the riser. The term "gaseous components" includes lift gas, product gases and vapors, and unconverted feed components.

An interface 32 is located between the first portion and the second portion of the riser. A pair of outlets 34 connect the riser with the first stage 36 of two sets of cyclone separators 38. The riser portion 29 has an open end 40 into which it receives a stripping vapor stream. A withdrawal of catalyst and gaseous components from outlets 34 dissipates the energy of the catalyst and gas mixture traveling upward into the riser so that an interface 32 is formed between a lower density catalyst region in the first portion of the riser and a higher catalyst density in the second portion of the riser at and above interface 32. Stripping gas entering from the open top of the riser also passes through the region of higher catalyst density in riser section 30 and is withdrawn by the outlets 34. Riser section 29 defines a disengagement chamber that operates as a disengaging zone 30. Gaseous components are separated from catalyst particles by the cyclone separators 38. Gaseous products and catalyst pass from conduit 34 through the first stage cyclones 36 and then to the second stage cyclones 42. Gaseous reactor products are recovered overhead from the second stage cyclones by lines 44 and separated catalyst particles are returned to a dense bed 46 by dip-legs 48 from the first stage cyclones and second stage dip legs 50 from the second stage cyclones. Spent catalyst and entrained and adsorbed hydrocarbons flow downwardly from bed 46 into a stripper 52. As catalyst flows downwardly through stripper 52, it is cascaded back and forth by a series of baffles 54. Steam is injected into a lower portion of the stripper by a distributor 56, and passes upwardly in countercurrent flow to the downwardly cascading stream of catalyst. A nozzle 58 withdraws catalyst from the bottom of the stripping zone 52 and transfers it to the catalyst regenerator 10 by a line 60. An oxygen-containing stream carried by line 62 contacts the catalyst in the regenerator and combusts clke from the catalyst thereby producing a flue gas stream of coke combustion by-products removed from the regenerator by a line 64 and providing the regenerated catalyst having a reduced concentration of coke. Any well-known regenerator arrangement for removing coke from the catalyst particles by the combustion of coke and returning catalyst particles to the reactor riser can be used and the particular details of the regeneration zone are not an important aspect of this invention.

The riser of this invention as arranged provides a unique region of catalyst and gas separation. Looking now at the operation of the upper portion of the riser, as depicted in FIG. 1, catalyst travels up the first portion of the riser and through riser section 26 in a typical plug flow manner and at a velocity of between 20 to 100 ft/sec with a catalyst density of between 1 to 5 $lb/ft^3$. The relatively uniform upward flow of the catalyst continues until it reaches the elevation of riser outlets 34. The energy of the gas and catalyst stream that travels up the riser immediately begins to dissipate when it reaches the elevation of riser outlets 34 due to the loss of pressure from the withdrawal of the gas and catalyst. However, the momentum of the gas and catalyst mixture continues to carry a majority of the catalyst and some of the gas upwardly past the outlets 34. The second portion of the riser is that portion where the velocity of the catalyst mixture passing up the riser begins to decrease due to the withdrawal of catalyst and gas from the riser or an increase in the flowing area of the riser. As the velocity of the catalyst particles continues to decay with the loss of the driving pressure, the relatively slower velocity of the particles that pass above the outlets 34 increases the residence time of the catalyst particles in the disengaging zone 30. The disengaging zone is generally that portion of the riser that contains catalyst and is located above interface 32. This increased residence time of catalyst passing into the disengaging zone 30 increases the catalyst density in the disengaging zone relative to the first portion of the riser. The momentum of the upwardly flowing catalyst and gas particles keeps the higher density region of catalyst suspended above the riser outlets 34. The upward momentum of catalyst particles as they travel past the riser outlet 34 impacts a force on the higher density catalyst in the disengaging zone that also supports the higher density region of catalyst above the riser outlet 34. There is a constant exchange of catalyst particles across interface 32 as newer particles passing up the riser have the momentum to cross the interface 32 and rise to top of disengaging zone 30 pushing other catalyst particles downwardly below the interface and into outlets 34. Any gaseous components from the riser and from the stream of stripping fluid that enters through the top of the riser also pass continually downward into outlets 34. For the sake of further definition, the disengaging zone of the riser refers to that part of the riser where there is a substantial decrease in the velocity of the catalyst and gaseous mixture flowing up the riser and/or where the riser outlets withdraw catalyst and gaseous components for separation in the separation device.

Therefore, as the mixture of gaseous components and catalyst flows up the riser, a change in velocity and density occurs as it passes into the second portion of the riser and across the interface 32. Catalyst in the first portion of the riser will have a velocity in a range of from 20 to 100 ft/sec and will have a density in a range of from 1 to 5 $lb/ft^3$. Once the catalyst and and components flow past the interface the density increases to at least 5 to 20 times the density in the first portion of the riser.

The downward flow of stripping gas and the continual shooting of particles through the interface into the upper section of disengaging zone 30 keeps catalyst and gases circulating downwardly out of disengaging zone 30. The interface 32 and the higher density of catalyst particles in disengaging zone 30 aids in the stripping of hydrocarbon vapors from the catalyst before it enters the outlets 34. The relatively higher catalyst density of disengaging zone 30 provides a contacting zone that allows the stripping vapors to perform additional stripping of the catalyst particles prior to its entering into the cyclones.

Catalyst withdrawn from the riser outlets may enter any type of a separation device that will complete the separation of the product gases from the catalyst. Typically, the outlets will feed the catalyst and gaseous mixture to a one or more stages of cyclone separators. Whatever separation device is used, it should be of a type that is directly connected to the riser outlets and substantially closed in order to prevent the reentry of gaseous components into the dilute phase of the reactor vessel. When cyclone separators are used, it can be either a single stage cyclone or a two-stage cyclone as depicted in FIG. 1. The separators will operate in an ordinary manner separating gaseous components from the catalyst and removing gaseous products from the reactor vessel while returning separated catalyst to a stripping zone.

Suitable stripping zones for this invention will be any type that can remove adsorbed hydrocarbons from the catalyst. In most cases, the stripping zone will consist of the usual baffle arrangement as shown in FIG. 1 wherein the catalyst particles are contacted countercurrently to an upward flow of stripping steam. The amount of stripping steam used in this process will be in the usual range, used for FCC operations and will normally vary between 1 to 3 lb of steam per 1000 lb of catalyst.

The disengaging zone at the upper end of the riser has an arrangement that will prevent catalyst from flowing out of the riser. In simplest form, catalyst is contained in the disengaging zone of the riser by providing an extended length 66 of riser above the outlets 34. In certain cases, an extended end 66 having the same diameter as the intermediate portion of the riser can be provided with enough length to prevent the ejection of catalyst particles out of the top of the riser. However, in many cases, a simple extended end may require more length for extension 66 than is available in the reactor vessel.

Figure 2:
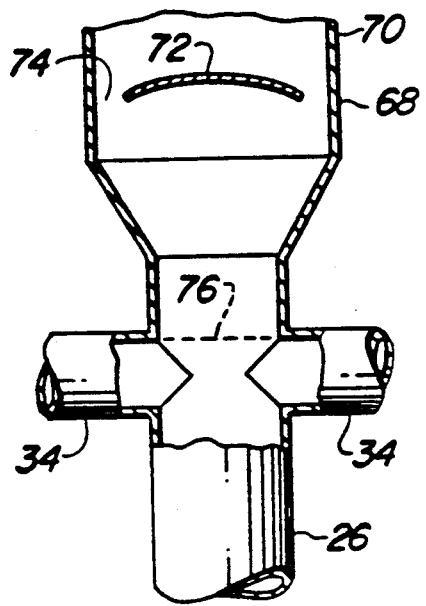
FIGS. 2-5 show alternate arrangements for the suspended disengaging zone of this invention.
Figure 3:
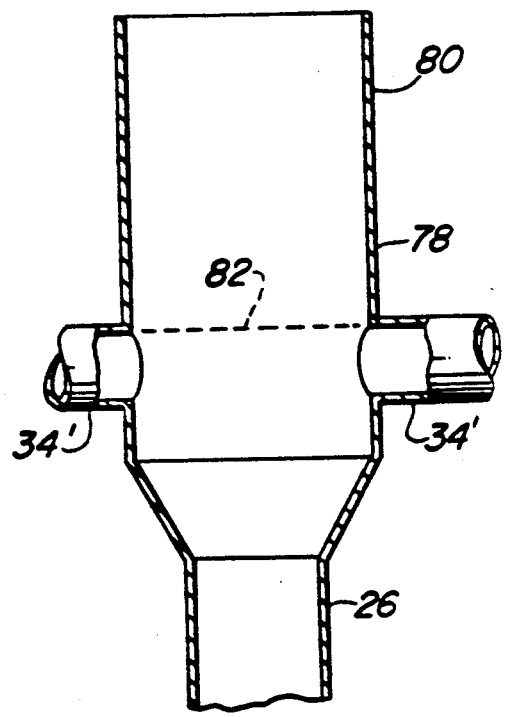
Figure 4:
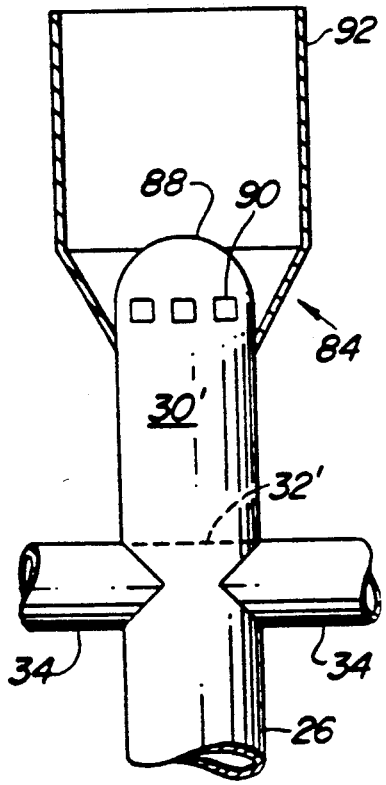

FIGS. 2-4 show a number of alternate arrangements for the end of the riser which will reduce the required height of the extension at the end of the riser to prevent the ejection of catalyst from the top of the riser. These arrangements can also provide a method for increasing the density in the disengaging section of the riser.

FIG. 2 shows an alternate arrangement for the upper end of the riser shown in FIG. 1. In this arrangement, outlets 34 are located above the intermediate portion of riser 26. Above the outlets the riser has an enlarged diameter section 68. The enlarged portion of the riser serves to more quickly dissipate any velocity jet that may extend past outlets 34. In addition, the enlarged diameter will tend to catch any catalyst particles that migrate above the open top 70. As a further means of containing catalyst particles, the end of the riser can be provided with an optional baffle 72. Baffle 72 occludes the open end of the riser and directly prevents any catalyst particles from shooting past the open end of the riser. Baffle 72 can also be arranged to provide an annular opening 74. Opening 74 is necessary to allow stripping vapors to enter the upper end of the disengaging section. Annular opening 74 can be designed as a restriction to maintain a positive pressure drop for the stripping vapor stream as it enters the top of the riser. Again, the decay of the kinetic energy associated with the catalyst and gaseous stream moving up the riser will cause a collapsing of the catalyst flow regime that enters the upper portion of the disengaging zone so that an interface 76 forms between a lower density stream of catalyst and gases in section 26 of the riser and the relatively higher density catalyst section above interface 76.

In another arrangement of this invention, the upper section of the riser is enlarged over a longer portion of the riser that includes the riser outlets. FIG. 3 shows such an arrangement wherein intermediate section 26 of the riser is followed by an enlarged portion 78. Riser outlets 34' are formed in the sidewall of enlarged section 78. As catalyst flows from section 26 into enlarged section 78, the velocity of the mixture decreases thereby partially dissipating the energy of the stream before it passes outlets 34'. Initial dissipation of the stream energy below the outlets 34 reduces the momentum of the catalyst particles in the disengaging zone so that catalyst is more readily contained below the open top 80 of the riser. The decay of kinetic energy and the collapsing of the catalyst bed as it continues to fall back into the enlarged section of the disengaging zone will again establish an interface 82 between an upper region of higher catalyst density and a lower region of lower catalyst density.

FIG. 4 demonstrates another arrangement from modifying the end of the riser to prevent the outflow of catalyst from the end of the riser. In this arrangement intermediate section 26 is followed by the outlets 34 as also depicted in FIG. 1. Above outlets 34, the riser has an end 84 that is closed by a head 88 except for one or more orifice openings 90. The head 88 deflects most catalyst that might shoot past the end of the riser and into the reactor vessel. Orifice openings 90 provide a restrictive flow passage for the entry of the stripping vapor stream and the reentry of any catalyst that migrates out through the orifice openings. This arrangement is particularly suitable for high velocity riser applications where catalyst particles still have a relatively high velocity when they impact on head 88 that can deflect catalyst out of the openings 90. An enlarged extension 92 of the riser catches any deflected catalyst that comes through the openings 90. Catalyst in extension 92 falls back through holes 90 and is returned to the disengaging zone 30' which operates with the interface 32'.

Figure 5:
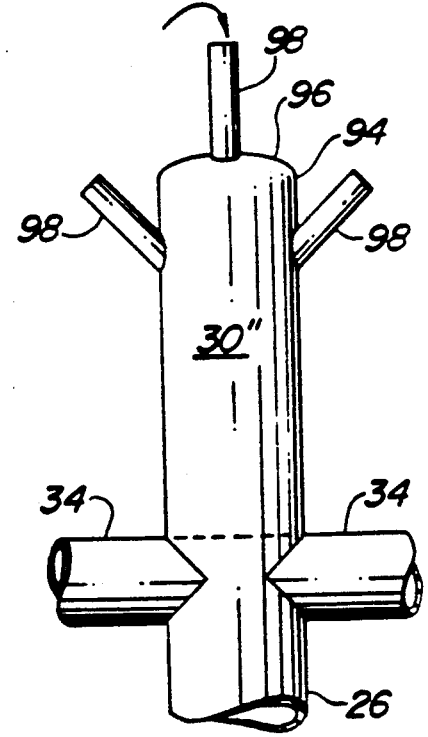

FIG. 5 shows that another arrangement for preventing catalyst migration out of the top of the riser. The intermediate portion of the riser and the outlets have the same arrangement as that shown in FIGS. 1 and 4. An upper end 94 of the riser is closed by a head 96. A small diameter nozzle 98 extends upwardly from the top of head 96 and/or outwardly from the sides of the riser. Nozzle 98 provides a restrictive opening for the return of the stripping vapor stream into the disengaging zone 30". As stripping vapor flows into the disengaging zone 30" through nozzle 98, it creates a positive pressure drop along the extended length of the nozzle that prevents any outflow or deflection of catalyst particles out throuh the end of nozzle 98.

The foregoing description sets forth essential features of this invention which can be adapted to a variety of applications and arrangements without departing from the scope and spirit of the claims hereafter presented.

I claim:

1. A process for the fluidized catalytic cracking (FCC) of an FCC feedstock, said process comprising:
   (a) passing said FCC feedstock and regenerated catalyst particles to a lower section of a reactor riser and transporting said catalyst and feedstock upwardly through a first portion of said riser thereby converting said feedstock to gaseous products and producing spent catalyst particles by the deposition of coke on said regenerated catalyst particles to yield a first mixture of spent catalyst and gaseous products below a riser outlet having a first density;
   (b) withdrawing a second mixture of spent catalyst and gaseous products from said riser through said riser outlet;
   (c) passing at least a portion of said first mixture of spent catalyst particles and gaseous products upwardly from said first portion of said riser into a suspension of catalyst particles at a downstream end of said riser without substantial discharge of catalyst out of said riser said suspension being located in a second portion of said riser comprising a disengaging zone, said disengaging zone having a majority of its length extending above said riser outlet and providing a region above said riser outlet having a second catalyst density, said second catalyst density having a density of at least five times said first catalyst density;
   (d) passing a stripping vapor stream into said disengaging zone;
   (e) passing said second mixture of catalyst particles and gaseous products to a particle separator;
   (f) recovering a gaseous product stream from said separator;
   (g) passing catalyst particles from said separator to a stripping zone and passing a stripping gas upwardly through said stripping zone and producing said gaseous stripping vapor stream; and,
   (h) passing spent catalyst from said stripping zone into a regeneration zone and contacting said spent catalyst with a regeneration gas in said regeneration zone to combust coke from said catalyst particles and produce regenerated catalyst particles for transfer to said reactor riser.

2. The process of claim 1 wherein said first mixture enters said second portion at a velocity in a range of from 20 to 100 ft/sec.

3. The process of claim 1 wherein said outlets are located at or below the bottom of said disengaging zone.

4. The process of claim 1 wherein said particle separators comprise cyclones.

5. The process of claim 1 wherein said disengaging zone of said riser has a larger cross-sectional area than said first portion of said riser.

6. The process of claim 1 wherein the downstream end of said riser is occluded to provide a restricted opening.

7. The process of claim 1 wherein the downstream end of the riser is open.

8. The process of claim 5 wherein said outlet is located in the larger cross sectional area portion of said disengaging zone.

9. The process of claim 1 wherein catalyst impacts a transverse surface in said disengaging zone.

10. The process of claim 9 wherein said disengaging zone extends above said transverse surface and the diameter of said disengaging zone increases above said transverse surface.

11. The process of claim 6 wherein stripping gas enters the downstream end of said riser through a vertically extended nozzle.

12. A process for the fluidized catalytic cracking (FCC) of an FCC feedstock, said process comprising:
 (a) passing said FCC feedstock and regenerated catalyst particles to a lower portion of a vertically extended reactor riser conduit and transporting said catalyst and feedstock upwardly through an intermediate portion of said riser conduit at a first catalyst density, said intermediate portion ending below a riser outlet, thereby converting said feedstock to a gaseous product stream and producing spent catalyst particles by the deposition of coke on said regenerated catalyst particles to yield a first mixture of spent catalyst and gaseous products;
 (b) passing at least a portion of said first mixture into an upper portion of said riser and deaccelerating said catalyst by passing said catalyst into a disengaging zone and holding a suspension of catalyst having a second catalyst density above said riser outlet, that is at least five times higher than said first catalyst density, in said disengaging zone, said disengaging zone being located at the downstream end of said riser in said upper portion and having a larger cross-sectional area than said intermediate portion of said riser;
 (c) passing a stripping vapor stream into the top of said reactor riser;
 (d) withdrawing a second mixture of spent catalyst and gaseous products from said upper portion of said riser through said riser outlet and passing said second mixture to a particle separator;
 (e) separating gaseous products from said spent catalyst in said particle separator, and returning said spent catalyst to a stripping zone;
 (f) recovering a gaseous product stream from said separator;
 (g) passing a stripping gas upwardly through said stripping zone and producing said stripping vapor stream; and,
 (h) passing spent catalyst from said stripping zone into a regeneration zone and contacting said spent catalyst with a regeneration gas in said regeneration zone to combust coke from said catalyst particles and produce regenerated catalyst particles for transfer to said reactor riser.

13. The process of claim 12 wherein said riser outlet is located in a lower section of said disengaging zone.

14. The process of claim 12 wherein said outlet is located at or below the bottom of said disengaging zone.

15. The process of claim 12 wherein said first riser density is in range of from 1 to 5 lb/ft$^3$ and said second riser density is at least 5 to 20 times higher than said first density.

16. The process of claim 1 wherein the downstream end of said reactor riser is occluded to provide a restricted opening.

* * * * *